(12) United States Patent
Myllyoja et al.

(10) Patent No.: US 11,643,606 B2
(45) Date of Patent: May 9, 2023

(54) METHOD FOR PRODUCING RENEWABLE BASE OIL AND RENEWABLE FUEL COMPONENTS

(71) Applicant: Neste Oyj, Espoo (FI)

(72) Inventors: Jukka Myllyoja, Porvoo (FI); Jaana Kanervo, Porvoo (FI); Jaana Makkonen, Porvoo (FI); Marja Tiitta, Porvoo (FI)

(73) Assignee: NESTE OYJ, Espoo (FI)

( * ) Notice: Subject to any disclaimer, the term of this patent is extended or adjusted under 35 U.S.C. 154(b) by 134 days.

(21) Appl. No.: 17/419,958

(22) PCT Filed: Dec. 20, 2019

(86) PCT No.: PCT/FI2019/050917
§ 371 (c)(1),
(2) Date: Jun. 30, 2021

(87) PCT Pub. No.: WO2020/141256
PCT Pub. Date: Jul. 9, 2020

(65) Prior Publication Data
US 2022/0081626 A1    Mar. 17, 2022

(30) Foreign Application Priority Data

Dec. 31, 2018  (FI) .................... 20186144
Dec. 31, 2018  (FI) .................... 20186145

(51) Int. Cl.
*C10G 45/02* (2006.01)
*C10G 3/00* (2006.01)

(52) U.S. Cl.
CPC ............. *C10G 45/02* (2013.01); *C10G 3/46* (2013.01); *C10G 3/47* (2013.01); *C10G 3/48* (2013.01);
(Continued)

(58) Field of Classification Search
CPC ............ C10G 45/02; C10G 3/46; C10G 3/47; C10G 3/48; C10G 3/50; C10G 2300/1003;
(Continued)

(56) References Cited

U.S. PATENT DOCUMENTS 3,078,637 A    2/1963  Milton
6,933,139 B2   8/2005  Brunner et al.
(Continued)

FOREIGN PATENT DOCUMENTS

CN    107673952 A    2/2018
CN    108325535 A    7/2018
(Continued)

OTHER PUBLICATIONS

Alm, Martin, "Animal Fats," The European Fat Processors and Renderers Association, Brussels, Belgium, 2013, AOCS Lipid Library, The American Oil Chemists' Society. (19 pages).
(Continued)

*Primary Examiner* — Youngsul Jeong
*Assistant Examiner* — Jason Y Chong
(74) *Attorney, Agent, or Firm* — Buchanan Ingersoll & Rooney PC

(57) ABSTRACT

The present disclosure relates to methods for producing renewable base oil and other valuable renewable fuel components from a feedstock of biological origin comprising free fatty acids and glycerides. The feedstock is first separated to two or more effluent streams containing a fatty acid fraction and glyceride fraction. The glycerides are hydrolyzed to free fatty acids and glycerol, and the fatty acids thus obtained are recycled to the separating. The fatty acids are then converted to the base oil by ketonisation, hydrodeoxygenation and hydroisomerisation. The glycerol is converted to propanols by selective hydrogenolysis.

39 Claims, 3 Drawing Sheets

(52) U.S. Cl.
CPC ............... *C10G 2300/1003* (2013.01); *C10G 2300/1011* (2013.01); *C10G 2300/4081* (2013.01); *C10G 2400/02* (2013.01); *C10G 2400/04* (2013.01); *C10G 2400/08* (2013.01)

(58) Field of Classification Search
CPC .... C10G 2300/1011; C10G 2300/4081; C10G 2400/02; C10G 2400/04; C10G 2400/08; C10M 2203/1025; C10M 105/04; C10N 2030/64; C10N 2060/02; C10N 2060/04; Y02P 30/20
See application file for complete search history.

(56) References Cited

U.S. PATENT DOCUMENTS

| | | |
|---|---|---|
| 9,120,713 B2 | 9/2015 | Kettunen et al. |
| 9,314,785 B1 | 4/2016 | Hommeltoft |
| 2002/0197687 A1 | 12/2002 | Brunner et al. |
| 2007/0077635 A1 | 4/2007 | Brunner et al. |
| 2012/0083633 A1 | 4/2012 | Aulich et al. |
| 2012/0142982 A1 | 6/2012 | Vanrysselberghe et al. |
| 2013/0150638 A1 | 6/2013 | Koivusalmi et al. |
| 2014/0114105 A1 | 4/2014 | Vermeiren et al. |
| 2014/0171699 A1 | 6/2014 | Wang et al. |
| 2014/0221675 A1 | 8/2014 | Agarwal |
| 2017/0362154 A1* | 12/2017 | Kettunen ............... B01J 21/063 |
| 2022/0009855 A1 | 1/2022 | Myllyoja et al. |

FOREIGN PATENT DOCUMENTS

| | | |
|---|---|---|
| EP | 1741768 A1 | 1/2007 |
| EP | 2155838 B1 | 9/2014 |
| EP | 3012310 A1 | 4/2016 |
| FI | 100248 B | 10/1997 |
| JP | 2003064394 A | 3/2003 |
| JP | 2009518530 A | 5/2009 |
| JP | 2010529274 A | 8/2010 |
| JP | 2015520162 A | 7/2015 |
| JP | 2017533204 A | 11/2017 |
| JP | 2017537174 A | 12/2017 |
| WO | 2007068795 A1 | 6/2007 |
| WO | 2008152199 A1 | 12/2008 |
| WO | 2008152200 A1 | 12/2008 |
| WO | 2013113976 A1 | 8/2013 |
| WO | 2013173155 A1 | 11/2013 |
| WO | 2015181721 A1 | 12/2015 |
| WO | 2016058953 A1 | 4/2016 |
| WO | 2016062868 A1 | 4/2016 |
| WO | 2016123198 A1 | 8/2016 |
| WO | 2018020321 A1 | 2/2018 |
| WO | 2018024728 A1 | 2/2018 |
| WO | 2018178130 A1 | 10/2018 |
| WO | 2018193074 A1 | 10/2018 |
| WO | 2018234186 A1 | 12/2018 |
| WO | 2018234187 A1 | 12/2018 |
| WO | 2018234188 A1 | 12/2018 |
| WO | 2018234189 A1 | 12/2018 |

OTHER PUBLICATIONS

ASTM International Designation:D6866-16, "Standard Test Methods for Determining the Biobased Content of Solid, Liquid, and Gaseous Samples Using Radiocarbon Analysis", ASTM International, Conshohocken, PA, US. (19 pages).
Cermak, Steven C., et al., "Distillation of Natural Fatty Acids and Their Chemical Derivatives", Distillation—Advances from Modeling to Applications, pp. 5, 110-140, Dr. Sina Zereshki (Ed.), ISN: 978-953-51-0428-5, InTech. (34 pages).
Finnish Search issued in corresponding Finnish Patent Application No. 20186145 dated Apr. 29, 2019. (2 pages).
Finnish Search Report issued in corresponding Finnish Patent Application No. 20186143 dated Apr. 24, 2019. (1 page).
Finnish Search Report issued in corresponding Finnish Patent Application No. 20186144 dated Apr. 29, 2019. (2 pages).
Handbook on Automobile & Allied Products 2nd Revised Edition, 2013, Ajay Kr Gupta, 10 Lube Oil, Base Oil, Mineral Oil, p. 117. (1 page).
International Search Report (PCT/ISA/210) and Written Opinion (PCT/ISA/237) dated Apr. 1, 2020, by the Finnish Patent and Registration Office as the International Searching Authority for International Application No. PCT/FI2019/050917. (15 pages).
International Search Report (PCT/ISA/210) and Written Opinion (PCT/ISA/237) dated May 15, 2020, by the Finnish Patent and Registration Office as the International Searching Authority for International Application No. PCT/FI2019/050900. (13 pages).
Lin, X., et al., "Hydrogenolysis of Glycerol by the Combined Use of Zeolite and Ni/Al2O3 as Catalysts: A route for Achieving High Selectivity to 1-Propanol," energy&fuels, Apr. 17, 2014, pp. 3345-3351, vol. 28, ACS Publications. (7 pages).
Moss, G.P et al., "Glossary of Class Names of Organic Compounds and Reactive Intermediates Based on Structure", Pure & Appl. Chem., 1995, pp. 1307-1375, vol. 67, Nos. 8/9, IUPAC, Great Britain. (69 pages).
Van Ryneweld, E., et al., "A catalytic route to lower alcohols from glycerol using Ni-supported catalysts," Green Chemistry, 2011, pp. 1819-1827, vol. 13, The Royal Society of Chemistry. (10 pages).
Zhu, S., et al., "One-step hydrogenolysis of glycerol to biopropanols over $Pt-H_4SiW_{12}O_{40}/ZrO_2$ catalysts", Green Chemistry, 2012, pp. 2607-2616, vol. 14, The Royal Society of Chemistry. (11 pages).
The Supplementary European Search Report dated May 18, 2022, by the European Patent Office in corresponding European Patent Application No. 1990670.3. (3 pages).
Notice of Allowance dated Nov. 19, 2021, by the U.S. Patent and Trademark Office in U.S. Appl. No. 17/419,885.
G. Pacchioni, "Ketonization of Carboxylic Acids in Biomass Converstion over TiO2 and ZrO2 Surfaces: A DFT Perspective", ACS Catalysis, vol. 4, pp. 2874-2888, (Year:2014).
Office Action dated Dec. 21, 2021, by the Japanese Patent Office in corresponding Japanese Patent Application No. 2021-538289, and an English Translation of the Office Action. (6 pages).
Office Action dated Dec. 21, 2021, by the Japanese Patent Office in corresponding Japanese Patent Application No. 2021-538290, and an English Translation of the Office Action. (6 pages).
Office Action dated Aug. 31, 2021, by the Canadian Patent Office in corresponding Canadian Patent Application No. 3,122,907. (4 pages).

\* cited by examiner

METHOD FOR PRODUCING RENEWABLE BASE OIL AND RENEWABLE FUEL COMPONENTS

FIELD

The present invention relates to methods for producing renewable base oil and renewable fuel components, in particular to methods using feedstocks of biological origin comprising free fatty acids and fatty acid glycerols.

BACKGROUND

Renewable resources and bio-based feedstocks present a sustainable alternative to petrochemical sources. The feedstock has been derived from e.g. variety of vegetable oils, animal fats, recycled waste oils and even microbial oils. Hydrotreated vegetable oils such as palm oil, derivatives thereof, animal fat and other wastes or residues have been the major feedstock dominating the global renewable fuel market.

In addition to fuels, fats and oils can be step-by-step processed also into renewable chemicals and renewable base oils. One of these processes includes ketonisation, which enables removal of the highly reactive carboxylic functional groups while increasing the carbon chain length at the same time. The formed ketones are building blocks for further condensation, e.g. hydrodeoxygenation, to obtain suitable products for the required applications.

WO2008/152200 A1 discloses a method for producing base oils comprising subjecting a feedstock comprising various oxygen containing organic molecules, including free fatty acids and fatty acid esters, to a condensation reaction and subsequent hydrodefunctionalization and isomerization reaction.

WO2007/068795 A1 discloses a process for producing a new type of high-quality hydrocarbon base oil of biological origin. The process comprises ketonisation, hydrodeoxygenation, and isomerization steps. Fatty acids and/or fatty acid esters based on biological raw materials are preferably used as the feedstock.

However, there is still a need for further efficient methods that can process low-value biological feedstocks into high-value products.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

It was observed in the present invention that overall yield of renewable base oil or renewable base oil components and renewable fuel components produced from a feedstock comprising free fatty acids and glycerides may be increased when the feedstock is first separated to a free fatty acid stream and to a glyceride stream followed by hydrolysis of the glycerides into free fatty acids and glycerol. The free fatty acids thus formed via hydrolysis may be recycled and combined with previously separated free fatty acid stream prior to further processing.

Accordingly, one object of the present invention is to provide a method for producing renewable base oil fulfilling the API Group III base oil specifications, having ≥90 wt-% saturated hydrocarbons, ≤0.03 wt-% sulfur and a viscosity index of ≥120, and renewable fuel components from a feedstock of biological origin, the method comprising the following steps:
 a) providing a feedstock comprising free fatty acids and glycerides, preferably originating from waste and residue materials,
 b) separating the feedstock to at least two effluent streams comprising
  (i) a first effluent stream comprising free fatty acids, and
  (ii) a second effluent stream comprising glycerides,
 c) hydrolyzing the glycerides of the second effluent stream into free fatty acids and glycerol, and
 d) subsequently recycling the free fatty acids obtained from step c) to the separating step b).

A further object of the present invention is to increase the yield of the renewable base oil product.

A yet further object of the present invention is to increase the yield of renewable fuel components obtained by the process in addition to the renewable base oil product.

A number of exemplifying and non-limiting embodiments of the invention are described in accompanied dependent claims.

Various exemplifying and non-limiting embodiments of the invention together with additional objects and advantages thereof, will be best understood from the following description of specific exemplifying and non-limiting embodiments when read in connection with the accompanying figures.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

DESCRIPTION

Figure 1:
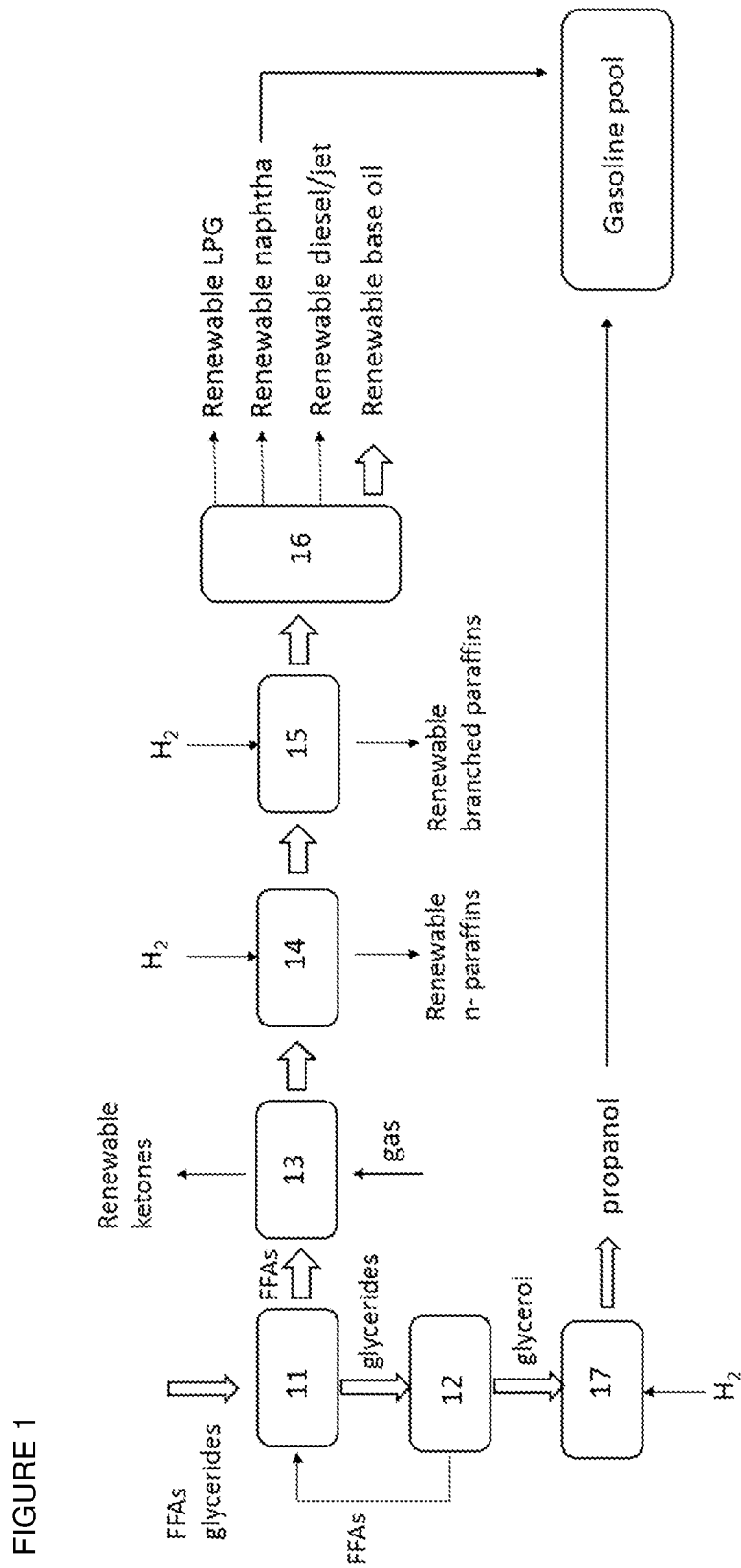
FIG. 1 shows the main features of the combined glycerol treatment and the renewable base oil production process of the present invention.

The specific examples provided in the description below should not be construed as limiting the scope and/or the applicability of the accompanied claims. Lists and groups of examples provided in the description are not exhaustive unless otherwise explicitly stated.

As defined herein base oil is an oil component which is suitable for use in lubricant manufacturing. The main use for base oils is in the manufacture of lubricants, of which there are many thousands of types. The best-known are automotive lubricants, but there are many more applications in which lubricants are used, such as metal processing, some of which are highly specialized. One liter of lubricant may be composed of anywhere between 50% and 90% by volume of base oil, the rest being made up of additives.

The American Petroleum Institute (API) divides base oils into five main categories shown in table 1. Groups I-III are petroleum base oils of varying qualities.

TABLE 1

API categories

| Group | Sulfur, wt-% | | Saturates, % | Viscosity Index (VI) |
|---|---|---|---|---|
| I | >0.03 | and/or | <90 | 80-119 |
| II | ≤0.03 | and | ≥90 | 80-119 |
| III | ≤0.03 | and | ≥90 | ≥120 |
| IV | Synthetic poly-alpha-olefins (PAOs) | | | |
| V | Any other type of base oil than group I-IV | | | |

The API defines the differences between Group II and III only in terms of the viscosity index (VI), and the Group III base oils are also called very high viscosity base oils (VHVI). However, also cold flow properties as well as the Noack volatility number are important characteristics of base oils.

Lubricant industry commonly extends the Group terminology of table 1 to include [Handbook on Automobile & Allied Products 2$^{nd}$ Revised Edition, 2013, Ajay Kr Gupta, 10 Lube Oil: page 117]:

Group I+: as Group I base oils but having a viscosity index of 103-108

Group II+: as Group II base oils but having a viscosity index of 113-119

Group III+: as Group III base oils but having a viscosity index of at least 140.

As defined herein the renewable base oil of the present invention fulfils at least the API Group III base oil specifications, having 90 wt % saturated hydrocarbons, ≤0.03 wt-% sulfur and a viscosity index of ≥120, and preferably, the API Group III+ base oil specifications, having ≥90% by weight saturated hydrocarbons, ≤0.03% by weight sulphur and a viscosity index of ≥140. Group III+ type of base oil has clearly better lubricating performance at cold conditions and simultaneously ensures lubrication in hot engine than Group III base oil.

As further defined herein ketonisation reaction is a reaction producing of a ketone through a chemical reaction of two compounds, in particular through a reaction between the acyl groups of two fatty acids or of two fatty acid esters.

As defined herein deoxygenation is a method for the removal of covalently bound oxygen from organic molecules. Deoxygenation includes hydrodeoxygenation (HDO) wherein oxygen is removed by hydrogenation.

As defined herein hydrogenation is a method for saturation of carbon-carbon double bonds by means of molecular hydrogen under the influence of a catalyst.

As defined herein fatty acids refer to carboxylic acids of biological origin, having carbon chain length higher than C4, such as C4-C28 (see IUPAC Gold book, PAC, 1995, 67, 1307 (Glossary of class names of organic compounds and reactivity intermediates based on structure (IUPAC Recommendations 1995) on p. 1335).

As defined herein fatty acid esters refer to triglycerides, fatty acid alkyl esters, esters of fatty acids with fatty alcohols, and natural waxes, all being of biological origin.

As defined herein animal fats are a by-product of the whole meat chain. Animal fats are not produced as such. They are only produced in relation to the raising of animals for meat, eggs, milk or wool production. Animal fats are a side, co- or by-product of the production of another animal product [Alm, M, (2013) Animal fats. [online]. Available at http://lipidlibrary.aocs.org/OilsFats/content.cfm?Item Number=40320 [Accessed Dec. 21, 2018].

As defined herein the feedstock is of biological origin. As further defined herein the renewable content of the feedstock of biological origin is determined from the starting materials, as well as being determined in the products by isotopic distribution involving $^{14}C$, $^{13}C$ and/or $^{12}C$ as described in ASTM D6866 (2018).

FIG. 1 shows the main features of the combined glycerol treatment and renewable base oil production processes according to the method of the present invention. In FIG. 1, the arrows and the reference numbers represent product streams and processes, respectively.

Accordingly, in FIG. 1 a feedstock comprising free fatty acids (FFAs) and glycerides is subjected to separation 11 to at least two effluent streams. The first effluent stream comprises the most part of the fatty acids, preferably at least 95% by weight, and the second effluent stream comprises the most part of the glycerides, preferably at least 85% by weight, more preferably at least 90% by weight. The glycerides are subjected to hydrolysis 12 to give rise to a glycerol stream and a further FFA stream. The further FFA stream is recycled back to the separation 11. Thus, the recycling increases yield of the FFAs available for further processing. The carbon chain length of the free fatty acids is preferably from C8 to C24.

According to a preferable embodiment, the combined FFA streams i.e. the FFAs directly obtained from the separation 11 together with those obtained via hydrolysis 12 and recycled back to the separation 11, are subjected to ketonisation i.e. a ketonisation reaction 13 followed by hydrodeoxygenation i.e. a hydrodeoxygenation reaction 14, and isomerization i.e. an isomerization reaction 15 to yield a renewable base oil containing stream, which is subjected to fractionation 16 to produce various renewable hydrocarbon components comprising renewable base oil and renewable liquid petroleum gas (LPG), renewable naphtha suitable for use as gasoline component, renewable diesel and/or renewable jet fuel. The glycerol stream, in turn, is subjected to hydrogenation 17 to yield an alcohol, preferably propanol i.e. renewable propanol, which may be combined with the renewable naphtha obtained from the FFA ketonisation (as shown in FIG. 1), thus increasing the yield of gasoline components, which may all be of biological origin i.e. renewable gasoline.

Thus, the method of the present invention produces not only the renewable base oil but also renewable ketones, renewable n-paraffins and renewable branched paraffins which can be isolated from the process when desired.

The free fatty acids of the first effluent stream comprise typically free fatty acids with varying carbon chain lengths.

According to one embodiment, the present invention concerns a method for producing renewable base oil preferably fulfilling the API Group III base oil specifications, having ≥90 wt % saturated hydrocarbons, ≤0.03 wt % sulfur and a viscosity index of ≥120, preferably fulfilling the API Group III+ base oil specifications, having ≥90 wt % saturated hydrocarbons, ≤0.03 wt % sulfur and a viscosity index of ≥140, and fuel components from a feedstock of biological origin, the method comprising the following steps:

a) providing a feedstock comprising free fatty acids and glycerides, b) separating the feedstock to at least two different effluent streams comprising
   (i) a set of first effluent streams comprising free fatty acids, and
   (ii) a second effluent stream comprising glycerides,
c) hydrolyzing the glycerides of the second effluent stream to free fatty acids and glycerol, and
d) subsequently recycling the free fatty acids obtained from step c) back into step b).

According to a particular embodiment the set of first effluent streams comprises
   (iii) a fatty acid fraction wherein the carbon chain length is C12-C16,
   (iv) an optional fatty acid fraction wherein the carbon chain length is at least C17, and
   (v) an optional fatty acid fraction wherein the carbon chain length is C11 or less.

According to a preferable embodiment, the method further comprises step e) of subjecting at least part or all of the (iii) fraction of the first effluent stream to ketonisation reaction at a temperature in the range from 100 to 500° C., preferably from 300 to 400° C., and at a pressure in the range from atmospheric pressure to 10 MPa, preferably from 0.5 to 3 MPa, in the presence of a ketonisation catalyst to produce a ketone containing stream.

According to another preferable embodiment, the method further comprises in addition to step e) a further step f) of subjecting at least part of the ketone stream of step e) to hydrodeoxygenation to yield a deoxygenated renewable base oil containing stream, i.e. n-paraffins.

According to another preferable embodiment, the method further comprises in addition to step e) a further step g) of subjecting at least part of the ketone stream of step e) to hydrodeoxygenation and to hydroisomerisation, simultaneously or in sequence, to yield a deoxygenated and isomerized renewable base oil containing stream.

The glycerol obtained in step c) is preferably hydrogenated to alcohols, preferably to propanols, and optionally to propane diols.

According to one embodiment the set of first effluent streams comprises a (iii) fatty acid fraction wherein the carbon chain length is C12-C16 and a (iv) fatty acid fraction wherein the carbon chain length is at least C17. The (iv) fatty acid fraction can be subjected to the ketonisation reaction separately or after premixing with part of the (iii) fatty acid fraction. According to another embodiment the (iv) fatty acid fraction is converted at least partly to oleochemicals.

Thus, according to one embodiment the set of first effluent streams comprises a fatty acid fraction wherein the carbon chain length is at least C17, i.e. the (iv) fatty acid fraction, and subjecting at least part or all of the (iv) fatty acid fraction to ketonisation reaction at a temperature in the range from 100 to 500° C., preferably from 300 to 400° C., and at a pressure in the range from atmospheric pressure to 10 MPa, preferably from 0.5 to 3 MPa, in the presence of a ketonisation catalyst to produce a ketone containing stream wherein the ketones are derived from the (iv) fatty acid fraction. The ketone stream can be admixed with the ketone steam derived from the (iii) fatty acid fraction or processed separately.

According to another embodiment, the method comprises admixing at least part or all of the (iv) fatty acid fraction and part of the (iii) fatty acid fraction to form an admixture, and subjecting the admixture to ketonisation reaction at a temperature in the range from 100 to 500° C., preferably from 300 to 400° C., and at a pressure in the range from atmospheric pressure to 10 MPa, preferably from 0.5 to 3 MPa, in the presence of a ketonisation catalyst to produce a ketone containing stream wherein the ketones are derived from the (iii) fatty acid fraction and from the (iv) fatty acid fraction.

The Feedstock

The feedstock suitable for use in the method according to the present invention comprises free fatty acids and glycerides, preferably 2-98%, preferably 5-90% by weight free fatty acids and at least 2%, preferably at least 5% by weight glycerides. Particularly suitable feedstocks for renewable base oil production are those which comprise abundantly C16 fatty acids, preferably at least 10% by weight of C16 fatty acids, more preferably at least 15% by weight C16 fatty acids.

Several oils and fats contain significant amounts of C16 fatty acids (FA). Part of the fatty acids are already in the form of free fatty acids (FFA), but part is bound to glycerides, such as C16FA containing glycerides.

Table 2 lists availability of C16 and C18 free fatty acids, and the fatty acid carbon chain lengths and unsaturation of exemplary fats and oils suitable for use in the method of the present invention (see Distillation—Advances from modeling to applications, Cermak, S et al., Distillation of Natural Fatty Acids and Their Chemical Derivatives; National Center for Agricultural Utilization Research, Agricultural Research Service, United States Department of Agriculture, USA).

TABLE 2

Exemplary feedstocks suitable for the method of the present invention.

| Fat/oil (%) | Fatty acid length and unsaturation (%) | | | | | | | | | | | | | Amount of FFAs [2]Amount of C16 and C18 FFAs |
|---|---|---|---|---|---|---|---|---|---|---|---|---|---|---|
| | 8:0 | 10:0 | 12:0 | 14:0 | 16:0 | 18:0 | 18:1 | 18:2 | 18: | 20:0 | 20:1 | 22:0 | 22:1 | |
| Acid oils | | | | | [1]5-45 | | | | | | | | | [1]30-100 |
| Canola | | | | 0.1 | 4.1 | 1.8 | 60.9 | 21.0 | | 0.7 | | 0.3 | | |
| Crude tall oil | | | | | [1]1-2 | | | | | | | | | |
| Cottonseed | | | | 0.7 | 21.6 | 2.6 | 18.6 | 54.4 | 0.7 | 0.3 | | 0.2 | | |
| Crumbe | | | | | 1.7 | 0.8 | 16.1 | 8.2 | 2.9 | 3.3 | | 2.2 | 59.5 | |
| Cuphea (PSR-23) | 0.8 | 81.9 | 3.2 | 4.3 | 3.7 | 0.3 | 3.6 | 2.0 | 0.3 | | | | | |
| Jatropha | | | | | [1]15 | | | | | | | | | [1]1.5-5 |
| Palm | | | 0.2 | 1.1 | 44.0 | 4.5 | 39.1 | 10.1 | 0.4 | 0.4 | | | | [1]4-7 |
| Palm Kernel | 3.3 | 3.4 | 48.2 | 16.2 | 8.4 | 2.5 | 15.3 | 2.3 | | 0.1 | 0.1 | | | |

TABLE 2-continued

Exemplary feedstocks suitable for the method of the present invention.

| Fat/oil (%) | Fatty acid length and unsaturation (%) | | | | | | | | | | | | | Amount of FFAs [2]Amount of C16 and C18 FFAs |
|---|---|---|---|---|---|---|---|---|---|---|---|---|---|---|
| | 8:0 | 10:0 | 12:0 | 14:0 | 16:0 | 18:0 | 18:1 | 18:2 | 18: | 20:0 | 20:1 | 22:0 | 22:1 | |
| Palm stearin | | | | | [1]60 | | | | | | | | | [1]0.1 |
| PFAD | | | | | [1]45 | | | | | | | | | [1]75-88 |
| Rapeseed | | | | | 2.7 | 1.1 | 14.9 | 10.1 | 5.1 | 10.9 | | 0.7 | 49.8 | |
| Soybean | | | 0.1 | 0.2 | 10.7 | 3.9 | 22.8 | 50.8 | 6.8 | 0.2 | | | | [1]2.5 |
| Sunflower | | | | | 3.7 | 5.4 | 81.3 | 9.0 | | 0.4 | | | | [1]0.5 |
| Tall oil heads | | | | | [1]35-45 | | | | | | | | | [1]100 |
| Lard | | 0.1 | 0.1 | 1.5 | 26.0 | 13.5 | 43.9 | 9.5 | 0,4 | 0.2 | 0.7 | | | [1]5-10 |
| Tallow | | | 0.1 | 3.2 | 23.4 | 18.6 | 42.6 | 2.6 | 0.7 | 0.2 | 0.3 | | | [1]5-10 |

[1]Values measure at the Analytics lab of Neste Oyj.
[2]Estimation of C16-C18 FFAs in % is based on ½ * TAN (total acid number analysis), which is a fair approximation.

Typical basic structural unit of plant and fish oils and animal fats is a triglyceride. Triglyceride is an ester of glycerol with three fatty acid molecules having the structure below:

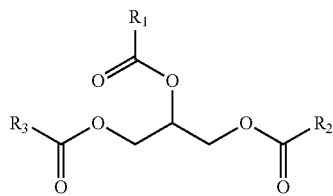

wherein $R_1$, $R_2$ and $R_3$ are same or different and represent C3-C27 hydrocarbon chains. The length of the hydrocarbon chain is typically 16 carbons (C16) and 18 carbons (C18) when in the form as free fatty acids. Typical carbon numbers of the fatty acids linked to the two other hydroxyl groups are even, being generally between carbon chain lengths from C12 to C22.

Prior to processing, the feedstock of biological origin may be pretreated with suitable known methods, such as thermally, mechanically for instance by means of shear force, chemically for instance with acids or bases, or physically with radiation, distillation, cooling, or filtering. The purpose of chemical and physical pretreatments is to remove impurities interfering with the process or poisoning the catalysts and to reduce unwanted side reactions.

Thus, feedstocks suitable for the method of the present invention comprise typically mono-, di- and/or triglycerides and free fatty acids. Exemplary feedstocks are plant fats, plant oils, plant waxes, animal fats, such as lard, tallow, yellow grease, brown grease, animal oils, animal waxes, fish fats, fish oils, and fish waxes. Preferably, the feedstock material originates from waste and/or residues of the mentioned exemplary feedstocks. More preferably, the waste and/or residues originate from sustainably produced products, the production routes of which are traceable.

Separation of the Fatty Acid Glycerols and the Free Fatty Acids

According to the method of the present invention, the glycerides are separated, preferably by vacuum distillation, from free fatty acids, providing at least two effluent streams, namely a first effluent stream comprising the free fatty acids and a second effluent stream comprising the glycerides. Carbon chain length of the free fatty acids is preferably at least 90% by weight from C8 to C24.

The free fatty acids of the first effluent stream comprise preferably fatty acid fractions with different carbon chain lengths. According to one embodiment, the free fatty acids are separated to a set of first effluent streams i.e. to several different streams comprising at least the streams, wherein (iii) the carbon chain length is C12-C16, wherein (iv) the carbon chain length is at least C17, and to a stream (v) wherein the carbon chain length is C11 or less.

The separation may be realized by using at least one vacuum distillation column, preferably from two to four columns, which may be in series, depending on the accuracy needed for the separation and on the fatty acid distribution of the feedstock, the feedstock type and quality.

According to one exemplary embodiment the separating produces a set of first effluent streams comprising
 a fatty acid fraction wherein at least 90% of the fatty acids have a carbon chain length of C11 or less i.e. an optional effluent stream (v) boiling below 260° C., preferably below 240° C., at atmospheric pressure.
 a fatty acid fraction wherein at least 90% of the fatty acids have a carbon chain length from C12 to C16 i.e. the effluent stream (iii) boiling at a range from 260° C. to 360° C., preferably at a range from 298° C. to 352° C., at atmospheric pressure.
 a fatty acid fraction wherein at least 90% of the fatty acids have a carbon chain length of C17 or more, i.e. an optional effluent stream (iv) boiling above 360° C., preferably above 374° C., at atmospheric pressure, and
 a fraction comprising the glycerides i.e. the second effluent stream, which is the distillation bottom.

The distillation temperatures are typically those measured at the exit of the distillation column(s). Herein the distillation temperatures are mathematically scaled to atmospheric pressures.

The non-volatile impurities in the distillation bottom can be removed using conventional methods, such as degumming and/or bleaching. In one embodiment, there may be a separate purification unit after withdrawal of the second effluent from the separation.

The separating can be done in a single distillation step or in two or three or more distillation steps. The distillation further purifies the distillate streams from metals and other heavy impurities which will reside after distillation at the bottom fraction. The fatty acids separated from the glycerols by hydrolysis remain pure due to the impurities remaining in the glycerol phase. When the excess water is subsequently separated from the glycerols before hydrogenolysis the impurities will be removed along with the water phase.

According to one embodiment, the method comprises separating a fatty acid fraction wherein the carbon chain length is C11 or less. This light fatty acid fraction may be used for production of oleochemicals. The removal of this fraction is beneficial for the subsequent ketonisation reaction.

Viscosity of the base oil can be controlled by adjustment of the distribution of fatty acids in feed. The effluent stream comprising fatty acids with a carbon chain length from C12 to C16 is an excellent feed for renewable base oil production. This selection provides low viscosity and low volatility performance to the base oil product.

The effluent stream comprising fatty acids wherein the carbon chain length is C17 or more may also be used as part of the feed to be ketonised, or it can be ketonised separately to produce longer carbon chain ketones and thus used for increasing viscosity for higher viscosity base oil applications. This effluent stream may further be partially, or alternatively, processed into oleochemicals.

According to one embodiment, at least part of the first effluent steam (iii) is used for production of oleochemicals. Naturally, this limits the availability of the C12-C16 fatty acids for production of renewable base oil and fuel components.

Preferably, the double bonds present are hydrogenated before ketonisation.

Hydrolysis of Glycerides

The glycerides which have been separated from the free fatty acids are hydrolyzed. The hydrolysis may be performed in a hydrolysis unit using known methods, for example such as the commercial Colgate—Emery process in a conventional manner. The hydrolysis step produces a free fatty acid stream and an aqueous glycerol stream.

In one embodiment, the separated glycerides are subjected to purification before entering into the hydrolysis step. This purification may include e.g. bleaching and/or deodorizing.

According to an exemplary embodiment purified palm oil is fed from the bottom of a hydrolysis column, and water is fed from the top of the column. The high temperature, such as about 250° C., and high pressure, such as about 50 MPa, enhance the solubility of water in oil phase where hydrolysis of oil takes place. The crude oil passes as a coherent phase from the bottom to the top through the hydrolysis column tower, whereas the heavier splitting water travels downward as a dispersed phase through the mixture of oil and fatty acid. The mixture of fatty acid and entrained water is obtained at the top while the sweet water which contains from 10 to 18% of glyceride is recovered at the bottom. Approximately two hours of reaction time is needed to reach degree of splitting up to 99%. The fatty acids are discharged from the top of the splitting column to an evaporator, where the entrained water is separated or flashed off. The water content is removed to prevent oxidation and degradation of the fatty acids. The water vapor is then condensed and collected at the feed water tank.

According to another embodiment, the glycerides are hydrolyzed by base, such as sodium hydroxide, in a conventional manner. The process produces glycerol and salts of fatty acids. The fatty acids are liberated from the salts prior to further processing by contacting them with strong mineral acids, such as sulfuric acid. Excess sulfuric acid and the formed sodium or potassium sulfate are removed by washing with water.

The hydrolysis unit comprises equipment material which is suitable for acidic or corrosive reagents. Since the method of the present invention includes separating the main part of the free fatty acids from the feedstock prior to hydrolysis, the size of the hydrolysis unit can be significantly diminished compared to a case where the feedstock is hydrolyzed as such prior to separating.

Ketonisation

According to a preferable embodiment, the one or more effluent streams comprising free fatty acids are subjected to ketonisation.

Ketonisation reaction is an excellent deoxygenation reaction when deoxygenation, stability and energy density of products are the targets, as is often the case in production of fuels and base oils. Ketonisation removes 75 mol-% of the oxygen bound to carboxylic acid molecules without hydrogen. This is very important for fuel applications aiming at greenhouse gas (GHG) emission reduction. During the ketonisation reaction two fatty acid molecules are reacted together forming the corresponding linear ketone. One molecule of $CO_2$ and water is simultaneously released during the reaction.

Ketonisation reaction can be carried out with high conversion, such as 95%, or 98%, or even 99.9%, and with excellent selectively, such as 85%, or 92%, or even 95%, which is the reason why the renewable base oil yield can be almost theoretical. Due to the very selective ketonisation reaction only few or no light hydrocarbons are formed, therefor, bio-$CO_2$ recovered from the ketonisation reaction can be very pure, preferably at least 99% by volume, and it can be used for varying applications. Naturally, the ketones produced from the free fatty acid fractions obtained by the method of the present invention may also be used as chemicals for various applications other than base oil or fuel component production.

Ketonisation conditions are typically specified by the reactor temperature and pressure, the used catalyst, the carrier gas/feed ratio and weight hourly space velocity of the feed. The selected ranges may be combined according to need depending on the parameters to be optimized.

In the present invention the ketonisation reaction may be carried out at a reaction temperature ranging from 100 to 500° C., preferably from 300 to 400° C., more preferably from 330 to 370° C., most preferably from 340 to 360° C. The pressure range may be from atmospheric pressure to 10 MPa, preferably from 0.5 to 3.0 MPa, more preferably from 1.0 to 2.5 MPa, most preferably from 1.5 to 2.0 MPa, in the presence of a ketonisation catalyst. A suitable ketonisation catalyst comprises one or more metal oxide catalysts. The metal of the metal oxide catalyst is preferably selected from one or more of Ti, Mn, Mg, K, Ca, and Zr containing metal oxide catalyst. A preferable catalyst is Ti containing metal oxide catalyst, most preferably $TiO_2$ containing catalyst. The weight hourly space velocity (WHSV) may be in the range from 0.25 to 3.0 $h^{-1}$, preferably from 0.5 to 2.0 $h^{-1}$, more preferably from 1.0 to 1.5 $h^{-1}$. Ketonisation reaction may be performed in the presence of a gas in the range from 0.1 to 1.5 gas/feed ratio (w/w), preferably from 0.25 to 1.0, most preferably from 0.5 to 0.75, wherein the gas/feed ratio (w/w) means the mass of gas fed into the ketonisation reactor per the inlet fatty acid mass of the liquid feed into the ketonisation reactor. The gas is selected from one or more of: $CO_2$, $H_2$, $N_2$, $CH_4$, $H_2O$. A particular gas is $H_2$, which may advantageously flow through the reactor into the next phase also requiring the presence of hydrogen, such as HDO. The most preferred gas is $CO_2$ as this is the product gas and may be efficiently recycled back to the feed, and it provides the most selective ketonisation reaction.

According one embodiment part of the ketones are converted to oleochemicals. According to an exemplary embodiment the oleochemicals are selected from a group consisting of alkanes, amines, imines, enamines, acetals, secondary alcohols and tertiary alcohols. Exemplary non-limiting reactions suitable for converting ketones to oleochemicals are shown below.

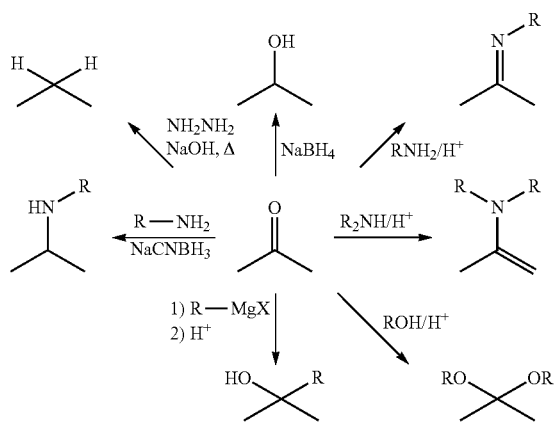

According to one embodiment part of the ketones derived from the (iii) fatty acid fraction is converted to oleochemicals.

According another embodiment the first effluent stream comprises the (iv) fatty acid fraction, and at least part of the (iv) fatty acid fraction is subjected to ketonisation reaction at a temperature in the range from 100 to 500° C., preferably from 300 to 400° C., and at a pressure in the range from atmospheric pressure to 10 MPa, preferably from 0.5 to 3 MPa, in the presence of a ketonisation catalyst to produce a stream comprising ketones derived from the (iv) fatty acid fraction and converting at least part of ketones derived from the (iv) fatty acid fraction to oleochemicals.

According still another embodiment the first effluent stream comprises the (v) fatty acid fraction, and at least part of the (v) fatty acid fraction is subjected to ketonisation reaction at a temperature in the range from 100 to 500° C., preferably from 300 to 400° C., and at a pressure in the range from atmospheric pressure to 10 MPa, preferably from 0.5 to 3 MPa, in the presence of a ketonisation catalyst to produce a stream comprising ketones derived from the (v) fatty acid fraction and converting at least part of the ketones derived from the (iv) fatty acid fraction to oleochemicals.

According to one embodiment, the obtained ketone stream is subjected to both hydrodeoxygenation (HDO) reaction conditions and to hydroisomerisation reaction conditions, simultaneously or in sequence, to yield a deoxygenated and isomerized product stream comprising renewable base oil.

According to another embodiment, part of the ketone stream is subjected to both hydrodeoxygenation (HDO) reaction conditions and to hydroisomerisation reaction conditions, simultaneously or in sequence, to yield a deoxygenated and isomerized base oil product stream comprising the renewable base oil, and a part of the ketone stream is used for producing oleochemicals.

According to still another embodiment, part of the ketone stream is subjected to the HDO and the hydroisomerisation reaction is omitted. According to this embodiment, the product is n-paraffin.

Hydrodeoxygenation (HDO)

Hydrodeoxygenation of the obtained ketones may be carried out as depicted e.g. in WO2007068795A1, WO2016062868A1 or EP2155838B1, and using a conventional hydrotreatment catalyst and hydrogen.

When the conversion of fatty acids is high 95-99%, the deoxygenation of ketones can be done at milder conditions, such as especially lower reaction temperature of about 250-280° C., than that for esters or carboxylic acids of about 280-330° C. HDO conversion and selectivity of ketones reacted to corresponding n-paraffins is high, almost theoretical, and therefore also the yield of these base oil range paraffins is high. If there are still remaining any unconverted acids from the ketonisation step in the feed decarboxylation of such fatty acids may take place producing $CO_2$. Decarboxylated fatty acids may be used as low GHG emission components, in renewable diesel applications after isomerization.

In one embodiment the hydrodeoxygenation takes place at reaction conditions comprising a temperature in the range from 100 to 500° C., preferably from 250 to 400° C., more preferably from 280-350° C., most preferably at temperature of 300-330° C.; and at a pressure in the range from atmospheric pressure to 20 MPa, preferably from 0.2 to 8 MPa, more preferably from 3 to 6 MPa, most preferably from 4 to 5 MPa. Preferably, the WHSV is in the range from 0.5 to 3.0 $h^{-1}$, more preferably from 1.0 to 2.5 $h^{-1}$, most preferably from 1.0 to 2.0 $h^{-1}$. Preferably, $H_2$ flow is in the range from 350 to 900 nl $H_2$/l feed, more preferably from 350 to 750, most preferably from 350 to 500, wherein nl $H_2$/l means normal liters of hydrogen per liter of the feed into the HDO reactor, in the presence of a hydrodeoxygenation catalyst. The hydrodeoxygenation catalyst is preferably selected from Pd, Pt, Ni, Co, Mo, Ru, Rh, W, or any combination of these, such as CoMo, NiMo, NiW, CoNiMo on a support, wherein the support is preferably alumina and/or silica.

Isomerisation

Isomerisation can be carried out in a conventional hydroisomerisation unit, such as those depicted in WO2007068795A1, WO2016062868A1 or EP2155838B1. Hydrogen is added into the isomerisation step.

Both the hydrotreatment step and isomerisation step may be conducted in the same reactor, and even in the same reactor bed. The isomerisation catalyst may be a noble metal bifunctional catalyst such as a Pt containing commercial catalyst, for example Pt-SAPO or Pt-ZSM-catalyst or for example a non-noble catalyst, such as NiW. The hydrodeoxygenation and hydroisomerisation steps may be done in the same catalyst bed using e.g. the NiW catalyst in both the hydrotreatment and isomerization. The NiW catalyst may additionally result in more hydrocracking to diesel and naphtha products and may be an advantageous catalyst if such products are also desired together with the renewable base oil product.

The isomerisation step is performed typically at a temperature from 200 to 450° C., preferably from 250 to 400° C., more preferably from 280 to 370° C., most preferably from 300 to 350° C. Pressure is typically from 1 to 15 MPa, preferably from 1 to 6 MPa, more preferably from 2 to 5 MPa, most preferably from 2.5 to 4.5 MPa. The WHSV is preferably from 0.5 to 3 1/h, more preferably from 0.5 to 2 1/h, most preferably from 0.5 to 1 1/h, and $H_2$ flow is in-liter $H_2$/liter feed, preferably from 100 to 800, more preferably from 200 to 650, most preferably from 350 to 500. It may be desirable to reduce the severity of the isomerization reaction to avoid or to reduce the amount of cracking of the renewable base oil product by selecting suitable combinations from the mentioned temperature, pressure WHSV and $H_2$ flow values.

According to one embodiment the hydroisomerisation catalyst comprises a Group VIII metal, preferably Pd, Pt or Ni and a molecular sieve, optionally on an alumina and/or silica support.

During isomerisation n-paraffins are branched i.e. forming i-paraffins. Preferably the conditions are chosen such that the branches are located at or near the terminal ends of the molecules, and therefore the cold flow properties of renewable base oil or renewable fuels are improved.

During the conventional hydroisomerisation of n-paraffins either to fuel components or to base oil components some cracking may be present. Therefore, the selection of the catalyst and optimization of reaction conditions are always important during the isomerisation step. Due to cracking during isomerisation of the base oil components some renewable diesel and naphtha may also be formed. The renewable diesel component thus obtained has excellent cold flow properties and can be used as winter grade diesel fuel as is i.e. 100%, without blending it to fossil middle distillate.

After isomerisation the products may be fractionated using conventional separation processes, especially fractionation by vacuum distillation, which can separate the renewable base oil containing product mixture into renewable liquefied petroleum gas (LPG) comprising C3 and C4 hydrocarbon components; renewable naphtha suitable for use as gasoline component; renewable diesel fuel and/or jet fuel i.e. aviation fuel such as HEFA or HEFA+ components, transformer oil components such as transformer oil having a boiling point of 280-300° C. or alternatively 280-350° C.; and to renewable base oil. Part of these fractionated end products can also be recycled back to ketonisation, HDO or isomerisation units in order to get additional process benefits, like heat control or selectivity improvements.

Production of Propanol and Propane Diols

The glycerol stream obtained from the hydrolysis may be processed further into valuable fuel components.

According to one embodiment, the glycerol stream is converted to propanols and/or propane diols by selective hydrogenation.

According to an exemplary embodiment, the hydrogenolysis is performed using a catalyst suitable thereto, such as platinum catalyst or metal-acid bifunctional catalysts containing platinum, and optionally heteropolyacids (HPA) such as silicotungstic acid, phosphotungstic acid (PTA), phosphomolybdic acid or silicomolybdic acid; supported on zirconia (Pt-HPA/$ZrO_2$) at normal atmospheric pressure, or preferably, at an overpressure. A particular catalyst is Pt-PTA/$ZrO_2$. The reaction is carried out at elevated temperature, typically at a temperature from 150 to 350° C., preferably from 150 to 270° C. under $H_2$ flow. WHSV is typically about 1 1/h.

The propanols may be separated from the reaction mixture comprising water, propanols and propane diols e.g. by distillation.

The propanols produced by the method of the present invention may be used as gasoline components thus increasing the yield of the components suitable for gasoline obtained by the ketonisation route only. The yield increase may be several percentages. Propanol has a lower volatility than ethanol which is typically used as a gasoline component. In addition, propanol has good octane rating.

This renewable gasoline component may be blended with the renewable naphtha obtained from the renewable base oil production, thus enabling production of an oxygenated hydrocarbon fuel that is totally renewable. Presently, there are no commercially available 100% renewable gasoline products, which have both the oxygenated component improving emission properties and the hydrocarbon component providing high energy density, of renewable origin. Propanol blending to aromatic free but rather low octane renewable naphtha component from the renewable base oil production according to the present invention is beneficial, because propanol can improve the octane number of the blend and aromatic free renewable naphtha increases the energy density of the fuel blend.

The deoxygenated and isomerised base oil containing stream or the distilled renewable base oil may have an oxygen content of less than 100 ppm, a viscosity of 3 to 15 cSt at 100° C., a viscosity index above 120, preferably above 140, such as between 140 and 170.

For example, the deoxygenated and isomerised base oil stream may be distilled to obtain the renewable base oil in a fraction having a boiling point of more than 380° C., such as more than 450° C., for example more 460° C. or more, such as 470° C. or more, such as 480° C. or more, or for example 500° C. or more. For example, the distillation may yield one or more fractions of renewable base oils, for example above 380° C., for example a fraction between 380-450° C. and a fraction above 450° C. During distillation other fractions, such as a naphtha fraction and/or a diesel fraction may also be isolated. These fractions are the result of cracking during the hydrodeoxygenation and hydroisomerisation reactions, as well as a very little amount of unconverted free fatty acid from the ketonisation step.

Further Optional Process Steps

The double bonds present in the fatty acids may be hydrogenated prior to ketonisation. The prehydrogenation (not shown in FIG. 1) is preferably performed at a temperature from 90 to 300° C., more preferably from 110 to 280° C., most preferably from 120 to 260° C. Pressure is preferably from 1.0 to 7.0 MPa, more preferably from 2.0 to 6 MPa, most preferably from 3 to 5 MPa. WHSV is preferably from 0.25 to 3 1/h, more preferably from 0.5 to 2 1/h, most preferably from 1 to 1.5 1/h. $H_2$ flow nl $H_2$/liter feed is preferably from 100 to 500, more preferably from 150 to 450, most preferably from 200 to 400.

When the hydrodeoxygenation and hydroisomerisation takes place in sequence, there may be a stripping step between the hydrodeoxygenation and isomerization, where gasses are separated from the liquids. This may take place in a high temperature and high-pressure separation step, for example at a temperature between 300-350° C., preferably 320-330° C. and pressure between 3 MPa and 6 MPa, preferably between 4 MPa and 5 MPa. The stripping step is not presented in FIG. 1.

After hydroisomerisation there may also be an optional hydrofinishing step, where the product is stabilized by conducting a further hydrogenation step in the presence of a hydrogenating catalyst, for example NiMo on an alumina support. However, other hydrofinishing catalysts containing metals of the Group VIII of the periodic system of the elements on e.g. an alumina and/or silica support may also be used. The hydrofinishing catalyst is preferably a supported Pd, Pt, or Ni catalyst, the support being alumina and/or silica. The hydrofinishing step is similar to the prehydrogenation step with regards to the reaction conditions. However, in the hydrofinishing step, typically higher pressures, and to some extent higher temperatures are utilized. This is because the feed is fully deoxygenated at this stage compared to a potential prehydrogenation step of fatty acids prior ketonisation. The hydrofinishing step is present in order to stabilize and decolorize the product which among other things involves hydrogenation of double bonds or aromatic compounds that is present or has formed during the previous steps, such as during hydroisomerisation. The hydrofinishing step may be conducted at a temperature below 300° C., such as below 280° C. or below 260° C. The hydrofinishing may also be above 180° C., such as above 190° C. or above 200° C. The temperature for hydrofinishing is preferably 180-300° C., more preferably 190-280° C., most preferably 200-250° C. The pressure is preferably 5-20 MPa, more preferably 10-18 MPa, most preferably 14-16 MPa. The WHSV is preferably 0.5-3.0 1/h, more preferably 0.75-2.5 1/h, most preferably 1.0-2.0 1/h. The hydrofinishing step is not presented in FIG. 1.

EXEMPLARY EMBODIMENTS

Figure 2:
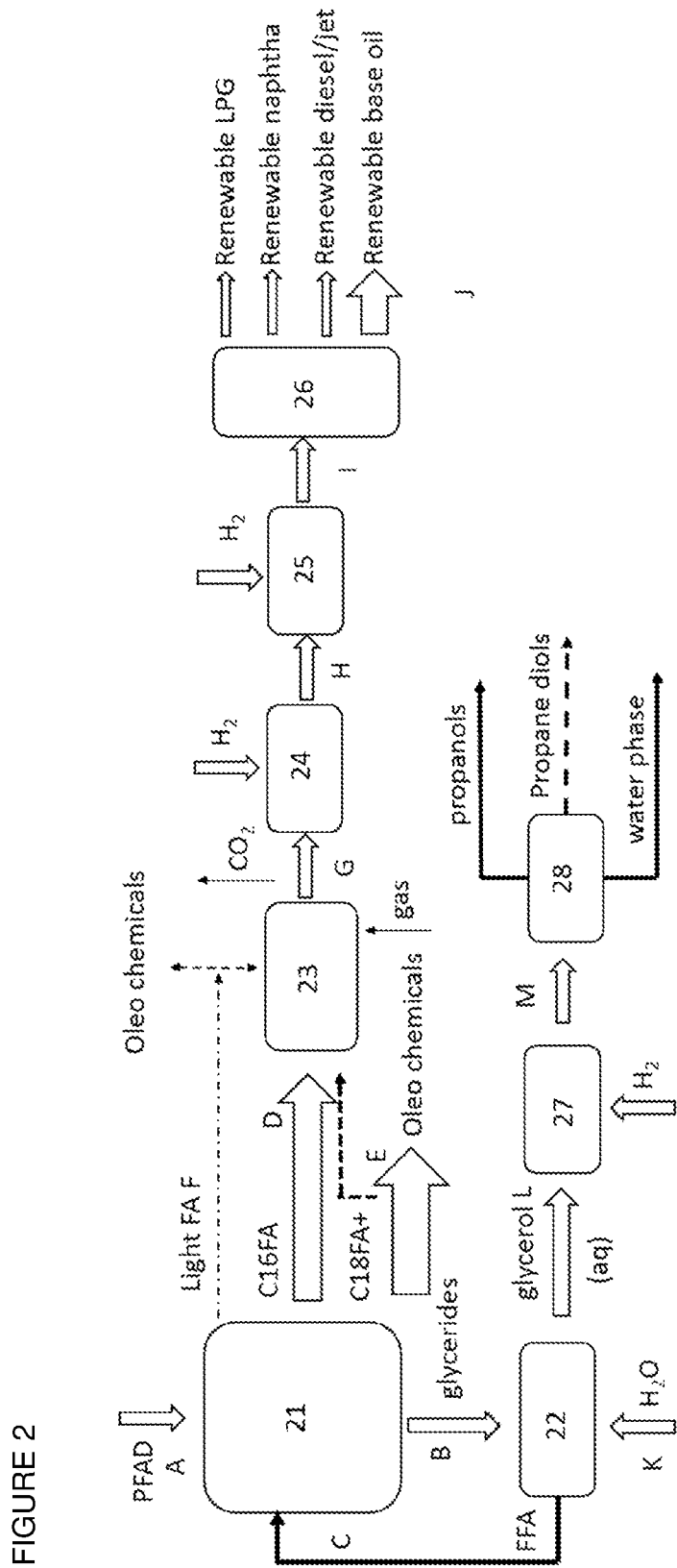
FIG. 2 shows an exemplary non-limiting schematic overview of renewable base oil production from palm oil fatty acid distillate (PFAD) according to the present invention.
Figure 3:
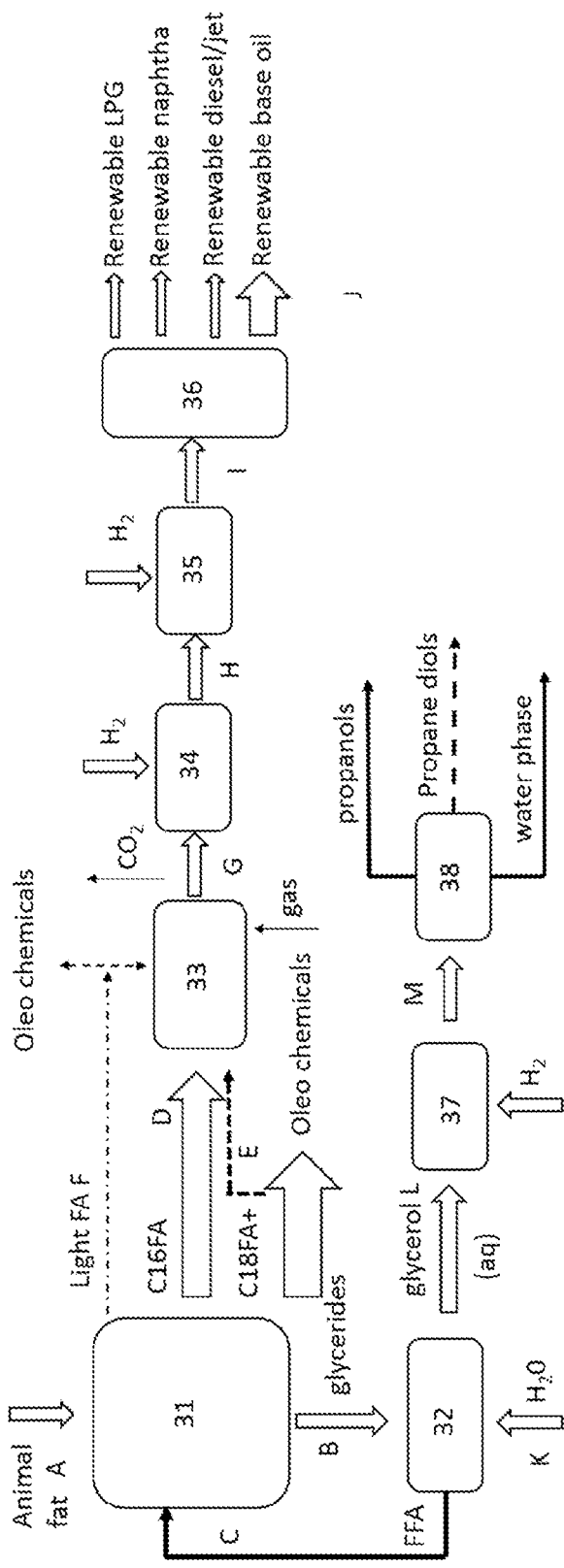
FIG. 3 shows an exemplary non-limiting schematic overview of renewable base oil production from animal fat according to the present invention.

FIGS. 2 and 3 show exemplary embodiments of the process according to the present invention for producing renewable base oil and other valuable renewable products starting from palm oil fatty acid distillate (PFAD) and animal fat, respectively. In the figures, the reaction steps and effluent streams are marked with reference numbers and arrows/capital letters, respectively. In the figures, the symbols C16FA, C18FA+, and Light FA's represent the first effluent streams (iii), (iv) and (v), respectively. Yields of each step are presented in tables 3 (PFAD as feedstock) and 4 (animal fat as feedstock) given in ktons when starting from 1000 kton of feedstock. Comparative yields are also provided for comparative processes performed without utilizing the fatty acids of the glycerides (fatty acid recycle).
Using PFAD as the Feed In the embodiment depicted by FIG. 2 the PFAD A used as the feed includes 88% by weight free fatty acids and 12% by weight fatty acid glycerides. The free fatty acids in PFAD are an almost 1:1 mixture of C16FA and C18 FA, respectively.

The glycerides are separated from fatty acids in a separation unit 21, which is a vacuum distillation column. 120 kton of glycerides B are obtained after separation, the rests are free fatty acids.

The glycerides are subjected to hydrolysis 22 with aqueous acid giving rise to an aqueous glycerol stream L and free fatty acids C. The hydrolysis of the glycerides present in PFAD produces 115 kton free fatty acids C from which 53 kton is C16 FA and 57 kton is C18 FA. Since hydrolysis adds water (K, ca 6.4% by weight, i.e. ca 7.7 ton) to the free fatty acids and to the glycerol produced, also the weights of these products are increased. Hydrolysis of glycerides which was present in PFAD produces about 115 kton of free fatty acids C, whereas the glycerol L yield is 12 kton. Glycerol is separated from water by distillation.

The free fatty acids C from the hydrolysis are recycled back to the separation unit 21 and are combined with the free fatty acids originally present in the feed. The combined FFAs are fractionated in the separation unit 21 by vacuum distillation. Fractionation of the fatty acids is preferably performed at a temperature from 250 to 275° C. at a pressure between 1-5 MPa, such as about 2 MPa. The fractionation produces 460 kton C16FA D and 492 kton of C18FA+E.

The C16FA D fraction is subjected to ketonisation 23 in the presence of a ketonisation catalyst to give the ketonised C16FA stream G. The ketonisation catalyst is a Ti containing metal oxide catalyst. The ketonisation reaction is carried out at a temperature from 340 to 360° C., and at a pressure from 1.5 to 2 MPa. WHSV is from 1 to 1.5 1/h. The ketonisation reaction is performed in the presence of carbon dioxide gas of about from 0.5 to 0.75 gas/feed ratio (w/w).

The liquid ketone stream G obtained from the ketonisation reaction is separated from gaseous products and water using a flash drum. $CO_2$ and water are further separated by cooling. The ketonisation step is very selective and it produces the desired long chain ketones in high yield which is over 85 wt-% (the theoretical ketone yield being 87.9 wt-%), also the $CO_2$ produced in the reaction is of high purity (>99 wt-%) after the separation from ketones and water. The bio-$CO_2$ thus produced is collected and can be used in various applications.

The ketonisation of C16FA originating from 1000 kton of PFAD, using the method of the present invention, produced 39.5 kton of bio-$CO_2$. The C16FA-fraction fed into the ketonisation produces 395.2 kton of ketone G.

The ketonised C16FA G is subjected to both a hydrodeoxygenation 24 and to a hydroisomerisation 25. The hydrodeoxygenation and the hydroisomerisation reaction are performed in sequence. The product is a deoxygenated and isomerized base oil stream I comprising the renewable base oil J.

The hydrodeoxygenation reaction is performed in the presence of a hydrodeoxygenation catalyst, NiMo, on an alumina support. The hydrodeoxygenation step is done in a fixed bed reactor under hydrodeoxygenation conditions to provide n-paraffins H. The temperature at the hydrogenation is from 300 to 330° C., and the pressure is from 4 to 5 MPa. WHSV is conveniently about 1-2 1/h, and $H_2$ flow from 350-500 nl $H_2$/l feed.

Hydrodeoxygenation of the ketonised feed originating from PFAD produced 376.6 kton n-paraffins.

The product of the hydrodeoxygenation step H is subjected to an isomerization step in the presence of hydrogen and an isomerization catalyst. The isomerization catalyst is a Pt containing commercial catalyst. The isomerization step is performed between 300-350° C., the pressure is between 2.5-4.5 MPa. The WHSV is between 0.5-1 1/h, and $H_2$ flow is between 350-500 n-liter $H_2$/liter feed.

Hydroisomerisation of the hydrodeoxygenated n-paraffins originating from PFAD feed produced 301.3 kton of branched paraffins.

The deoxygenated and isomerized product stream I obtained comprises the renewable base oil and fuel components. The fractionation 26 of products is done by vacuum distillation, which separates renewable LPG (liquefied petroleum gas;

C3 and C4 hydrocarbon components), renewable naphtha (gasoline component), renewable diesel and/or jet fuel, and the renewable base oil.

The separation step 21 produces 120 kton glycerides B which are hydrolyzed to free fatty acids C and glycerol L. Glycerol produced is converted to propanols by selective hydrogenation 27 wherein the propanols are prepared by catalytic conversion of glycerol at 200-300° C. in the presence of Pt modified $ZrO_2$ catalyst.

Yield of the propanols M is 8 kton when PFAD is used as the feedstock. The propanols are separated 28 from water phase and may be blended with the renewable naphtha from the ketonisation route.

The C18FA+ fraction E can be used for production of oleochemicals or it can be ketonised. When ketonised, the C18FA+ fraction E can be admixed with the C16FA fraction D prior to ketonization, or it can be ketonized separately and admixed with the ketone stream G. Viscosity of the product can be tuned by changing the C18FA+/C16FA ratio in the ketonization reaction. When the C18FA+ fraction and the C16FA fraction are ketonized separately, and the two ketone streams formed can be admixed as desired and processed together further as desired.

Part of the ketonised C16FA fraction G can be converted to oleochemicals such as alkanes, amines, imines, enamines, acetals, secondary alcohols and tertiary alcohols.

Part or all the C18FA+ fraction E can be ketonised and converted to oleochemicals such as alkanes, amines, imines, enamines, acetals, secondary alcohols and tertiary alcohols.

The light FA fraction F can be converted to oleochemicals as alkanes, amines, imines, enamines, acetals, secondary alcohols and tertiary alcohols also after ketonisation.

Yields of products obtained from PFAD using the method of the present invention are collected into table 3. The table further shows the yields for a comparative process i.e. a process without exploiting the glycerides present in the feed.

TABLE 3

| Product | Comparative process yield/kton | Process according to invention using PFAD as feed yield/kton |
|---|---|---|
| total C16FA D | 407 | 460 |
| total C18FA+ E | 436 | 492 |
| glycerol L | — | 12 |
| ketonized C16 base oil precursor G | 349.6 | 395.2 |
| Bio-$CO_2$ from keto step | 35.0 | 39.5 |
| C16FA RBO J | 266.6 | 301.3 |
| propanol M | — | 8.5 |

Using Animal Fat as the Feed

In the embodiment depicted by FIG. 3 animal fat is used as the feed containing 20% by weight free fatty acids and 80% by weight fatty acid glycerides. The animal fat feed includes significantly more C18 fatty acids than C16 fatty acids (60.6% vs 25.6% by weight).

The feed is processed similarly to as described for PFAD feed. The reference numbers, arrows, and capital letters in FIG. 3 are as explained above for FIG. 2.

Yields of products obtained starting from animal fat feed using the method of the present invention are collected in table 4. The table further shows yields when the process is performed without making use of the FFAs obtained from the glyceride hydrolysis and recycling.

TABLE 4

| Product | Comparative process yield/kton | Process according to invention using animal fat as feed yield/kton |
|---|---|---|
| total C16FA D | 51.2 | 246.9 |
| total C18FA+ E | 121.2 | 584.4 |
| glycerol L | — | 86.8 |
| ketonized C16 base oil precursor G | 44.0 | 212.3 |
| Bio-$CO_2$ from keto step | 4.4 | 21.2 |
| C16FA RBO J | 33.6 | 161.9 |
| propanol M | — | 56.7 |

As seen from tables 3 and 4, when the glycerides are hydrolyzed, and the free fatty acids thus formed are recycled to the process, the yields of several useful products are significantly increased. For example, the yield of the C16FA RBO was increased by 476%. Furthermore, the glycerol fraction can be processed to a highly valuable bio propanol which can be used e.g. as gasoline component.

The specific examples provided in the description given above should not be construed as limiting the scope and/or the applicability of the appended claims.

The invention claimed is:

1. A method for producing a renewable base oil fulfilling the API Group III base oil specifications, having ≥90 wt % saturated hydrocarbons, ≤0.03 wt % sulfur and a viscosity index of ≥120, and renewable fuel components from a feedstock of biological origin, wherein the method comprises:
   a) providing a feedstock containing free fatty acids and glycerides;
   b) separating the feedstock to at least two effluent streams containing:
      (i) a first effluent stream containing free fatty acids; and
      (ii) a second effluent stream containing glycerides;
   c) hydrolyzing the glycerides of the second effluent stream to provide free fatty acids and glycerol; and
   d) recycling the free fatty acids obtained in step c) to the separating step b);
   wherein at least part of the first effluent stream containing free fatty acids is subjected to ketonization reaction to produce a ketone containing stream, and wherein the ketone containing stream is subjected to hydrodeoxygenation reaction to yield a product comprising the renewable base oil.

2. The method according to claim 1, wherein the first effluent stream is a set of first effluent streams comprising:
   (iii) a fatty acid fraction wherein a carbon chain length is C12-C16;
   (iv) an optional fatty acid fraction wherein a carbon chain length is at least C17; and
   (v) an optional fatty acid fraction wherein a carbon chain length is C11 or less.

3. The method according to claim 2, comprising:
   e) subjecting at least part or all of the (iii) fatty acid fraction of the first effluent stream to ketonization reaction at a temperature in a range from 100 to 500° C., and at a pressure in a range from atmospheric pressure to 10 MPa, in a presence of a ketonization catalyst to produce the ketone containing stream.

4. The method according to claim 3, wherein the ketonization catalyst is a metal oxide catalyst.

5. The method according to claim 4, wherein the metal of the metal oxide catalyst is selected from the group consisting of Mg, K, Sc, Y, La, Ce, Fe, Co, Ni, Cu, Zn, Sr, Zr, Mo, Rh, Sn, Ti, Mn, Mg, Ca, Zr, and mixtures thereof.

6. The method according to claim 4, wherein the metal oxide catalyst is a Ti containing metal oxide catalyst.

7. The method according to claim 4, wherein the metal oxide catalyst is a $TiO_2$ containing catalyst.

8. The method according to claim 3, wherein the ketonization reaction is performed in presence of a gas in a range from 0.1-1.5 gas/feed ratio (w/w), the gas being selected from the group consisting of $CO_2$, $H_2$, $N_2$, $CH_4$, $H_2O$, and mixtures thereof.

9. The method according to claim 3, comprising:
   f) subjecting part of the ketone containing stream of step e) to hydrodeoxygenation reaction, to yield an n-paraffin containing stream.

10. The method according to claim 9, wherein the hydrodeoxygenation reaction is performed at a temperature in a range from 100 to 500° C.; and a pressure in a range from atmospheric pressure to 20 MPa, in a presence of a hydrodeoxygenation catalyst.

11. The method according to claim 10, wherein the hydrodeoxygenation reaction is performed at a WHSV in a range from 0.5 to 3 h$^{-1}$.

12. The method according to claim 10, wherein the hydrodeoxygenation reaction is performed at a H$_2$ flow of 350-900 NI H$_2$/I feed.

13. The method according to claim 10, wherein the hydrodeoxygenation catalyst is selected from the group consisting of Pd, Pt, Ni, CoMo, NiMo, NiW, and CoNiMo, wherein the hydrodeoxygenation catalyst is supported on a support.

14. The method according to claim 13, wherein the support is alumina and/or silica.

15. The method according to claim 10, wherein the hydrodeoxygenation reaction is performed at a temperature in a range from 250 to 400° C.; a pressure in a range from 0.2 to 8 MPa; a WHSV in a range from 0.5 to 3 h$^{-1}$, and a H$_2$ flow of 350-900 NI H$_2$/I feed.

16. The method according to claim 3, comprising:
g) subjecting at least part of the ketone containing stream of step e) to hydrodeoxygenation reaction and to hydroisomerization reaction, simultaneously or in sequence, to yield a renewable base oil containing stream.

17. The method according to claim 16, wherein the hydrodeoxygenation reaction and the hydroisomerization reaction are performed in sequence, and wherein the step g) comprises:
stripping gases from a hydrodeoxygenation product prior to the hydroisomerization.

18. The method according to claim 16, wherein the hydroisomerization reaction is performed at a temperature in a range from 200 to 450° C.; and a pressure in a range from 1 to 15 MPa, in a presence of an hydroisomerization catalyst.

19. The method according to claim 18, wherein the hydroisomerization reaction is performed at a WHSV in a range from 0.5 to 3 h$^{-1}$.

20. The method according to claim 18, wherein the hydroisomerization reaction is performed at a H$_2$ flow of 100-800 NI H$_2$/I feed.

21. The method according to claim 18, wherein the hydroisomerization catalyst comprises:
a Group VIII metal and a molecular sieve.

22. The method according to claim 18, wherein the hydroisomerization catalyst comprises:
a Group VIII metal, including Pd, Pt or Ni, and a molecular sieve.

23. The method according to claim 18, wherein the hydroisomerisation catalyst comprises:
a Group VIII metal and a molecular sleeve on an alumina and/or silica support.

24. The method according to claim 18, wherein the hydroisomerization reaction is performed at a temperature in a range from 250 to 400° C., a pressure in a range from 1 to 6 MPa; a WHSV in a range from 0.5-3 h-1, and a H2 flow of 100-800 NI H2/I feed.

25. The method according to claim 16, comprising:
subjecting the renewable base oil containing stream to separation to yield the renewable base oil.

26. The method according to claim 16, comprising:
subjecting the renewable base oil containing stream to separation, by distillation, to yield the renewable base oil.

27. The method according to claim 16, comprising:
subjecting the renewable base oil containing stream to separation to yield the renewable base oil, and also one or more fuel components selected from the group consisting of renewable liquefied petroleum gas, renewable naphtha, renewable jet fuel and renewable diesel.

28. The method according to claim 16, comprising:
subjecting the renewable base oil containing stream to separation to yield the renewable base oil, and renewable naphtha; and
treating the glycerol of step c) with hydrogen in a presence of a catalyst at an elevated temperature from 150 to 350° C. to produce renewable propanol wherein the renewable propanol and the renewable naphtha are mixed together to form gasoline components.

29. The method according to claim 3, comprising:
e) subjecting at least part or all of the (iii) fatty acid fraction of the first effluent stream to ketonization reaction at a temperature in a range from 300 to 400° C., and at a pressure in a range from atmospheric pressure from 0.5 to 3 MPa.

30. The method according to claim 2, wherein the (iv) fatty acid fraction is converted to oleochemicals.

31. The method according to claim 2, wherein the (v) fatty acid fraction is converted to oleochemicals.

32. The method according to claim 1, comprising:
treating the glycerol of step c) with hydrogen in a presence of a catalyst at an elevated temperature from 150 to 350° C. to produce renewable propanol.

33. The method according to claim 32, wherein the catalyst is Pt modified ZrO$_2$.

34. The method according to claim 32, comprising:
producing renewable propane diol.

35. The method according to claim 1, wherein the renewable base oil fulfills the API Group III+base oil specifications, having ≥90 wt % saturated hydrocarbons, ≤0.03 wt % sulfur and a viscosity index of ≥140.

36. The method according to claim 1, wherein the feedstock comprises:
2-98% by weight free fatty acids, and at least 2% by weight glycerides.

37. The method according to claim 1, wherein the feedstock is selected from the group consisting of plant fats, plant oils, plant waxes, animal fats, animal oils, animal waxes, fish fats, fish oils, PFAD and fish waxes.

38. The method according to claim 1, comprising:
originating the feedstock from waste and residue materials.

39. The method according to claim 1, wherein the feedstock comprises:
5-90% by weight free fatty acids, and at least 5% by weight glycerides.

* * * * *